United States Patent
Agrawal et al.

(10) Patent No.: US 12,107,906 B2
(45) Date of Patent: *Oct. 1, 2024

(54) EYE CONTACT PROMPTING ELECTRONIC DEVICE IN A VIDEO COMMUNICATION SESSION

(71) Applicant: MOTOROLA MOBILITY LLC, Wilmington, DE (US)

(72) Inventors: Amit Kumar Agrawal, Bangalore (IN); Rahul B Desai, Hoffman Estates, IL (US); Bill Ryan, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,149

(22) Filed: Jun. 30, 2023

(65) Prior Publication Data

US 2023/0421622 A1    Dec. 28, 2023

Related U.S. Application Data

(63) Continuation of application No. 17/502,327, filed on Oct. 15, 2021, now Pat. No. 11,870,825.

(51) Int. Cl.
| | |
|---|---|
| *H04L 65/403* | (2022.01) |
| *G06F 3/14* | (2006.01) |
| *G06T 7/70* | (2017.01) |
| *G06V 40/10* | (2022.01) |
| *G06V 40/16* | (2022.01) |
| *G06V 40/20* | (2022.01) |

(Continued)

(52) U.S. Cl.
CPC ......... *H04L 65/403* (2013.01); *G06F 3/1423* (2013.01); *G06T 7/70* (2017.01); *G06V 40/10* (2022.01); *G06V 40/161* (2022.01); *G06V 40/20* (2022.01); *G10L 15/22* (2013.01); *H04N 23/90* (2023.01); *G06T 2207/10016* (2013.01); *G06T 2207/30201* (2013.01)

(58) Field of Classification Search
CPC ......... H04L 65/403; G06T 7/70; G06V 40/10; G06V 40/161; G06V 40/20; H04N 23/90; G06F 3/1423; G10L 15/22
See application file for complete search history.

(56) References Cited

U.S. PATENT DOCUMENTS

| | | | | |
|---|---|---|---|---|
| 9,325,939 | B2 * | 4/2016 | Schultz | G06V 40/18 |
| 9,538,130 | B1 * | 1/2017 | Ford | H04N 7/15 |
| 11,259,349 | B1 | 2/2022 | Liu | |

(Continued)

*Primary Examiner* — Olisa Anwah
(74) *Attorney, Agent, or Firm* — Isidore PLLC

(57) ABSTRACT

An electronic device, computer program product, and method are provided that prompt a person who is participating in a video communication session with at least one second electronic device to gaze toward a local image capturing device. A controller of the electronic devices receives an image stream from an image capturing device having a field of view that incorporates a person that is proximate to the display device. The controller communicates the image stream to a video communication session. In response to a trigger that indicates that the first image stream is being presented as a primary image stream by the at least one second electronic device, the controller presents a prompt indicating that the participant should gaze toward the image capturing device.

17 Claims, 9 Drawing Sheets

(51) Int. Cl.
    *G10L 15/22*    (2006.01)
    *H04N 23/90*    (2023.01)

(56)           References Cited

U.S. PATENT DOCUMENTS

| 11,443,560 | B1 * | 9/2022  | Wright ................ G06F 3/0486 |
| 2007/0013801 | A1 | 1/2007 | Sezan |
| 2015/0304604 | A1 | 10/2015 | Sharma |
| 2018/0241882 | A1 * | 8/2018 | Lee ..................... H04N 7/147 |
| 2021/0097267 | A1 * | 4/2021 | Stokman ................ G06V 40/28 |
| 2022/0086391 | A1 * | 3/2022 | Matula ................... G08B 5/36 |
| 2022/0126201 | A1 * | 4/2022 | Ma ....................... H04L 65/1059 |
| 2022/0141266 | A1 * | 5/2022 | Cossar .................. G10L 25/63 |
| | | | 348/14.04 |
| 2023/0105206 | A1 * | 4/2023 | Condorovici ......... G06V 40/18 |
| | | | 348/14.08 |

* cited by examiner

EYE CONTACT PROMPTING ELECTRONIC DEVICE IN A VIDEO COMMUNICATION SESSION

RELATED APPLICATION

This application is a continuation of U.S. patent application Ser. No. 17/502,327, filed Oct. 15, 2021, the contents of which are fully incorporated herein by reference.

BACKGROUND

1. Technical Field

The present disclosure relates generally to electronic devices that support and/or enable video communication sessions with second communication device(s), and more particularly to electronic devices that can communicatively connect to more than one local camera during a video communication session.

2. Description of the Related Art

Electronic devices such as mobile phones, network servers, desktop workstations, laptops, and tablets are often used to participate in or to enable online human communication. So as to simulate an in-person conversation, meeting, or lecture, each participant in a video communication session generally positions themself within the field of view of the local camera and within detection range of the microphone. The respective image and audio streams are communicated to the video communication session for presentation by one or more second electronic devices. Participants can use the image capturing device to capture an image stream of the participant for sharing with the video communication session.

In normal user communication, eye-to-eye contact is often desirable to convey that the communicating parties are paying attention and/or have interest in what the other parties are saying. Participants in the video communication can use multiple devices to enhance the experience, such as having a large display monitor or laptop that augments the display capabilities of a communication device such as a smartphone that provides the other functions. In the multiple device scenario, the local participant tends to look away from the image capturing device, gazing instead toward a larger display. Consequently, when the local participant speaks, the local image stream may be prominently presented at remote second communication devices used respectively by remote participants. The lack of apparent eye contact provided by the local participant results in a degradation in the user experience for remote participants when engaged in a virtual human communication using the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
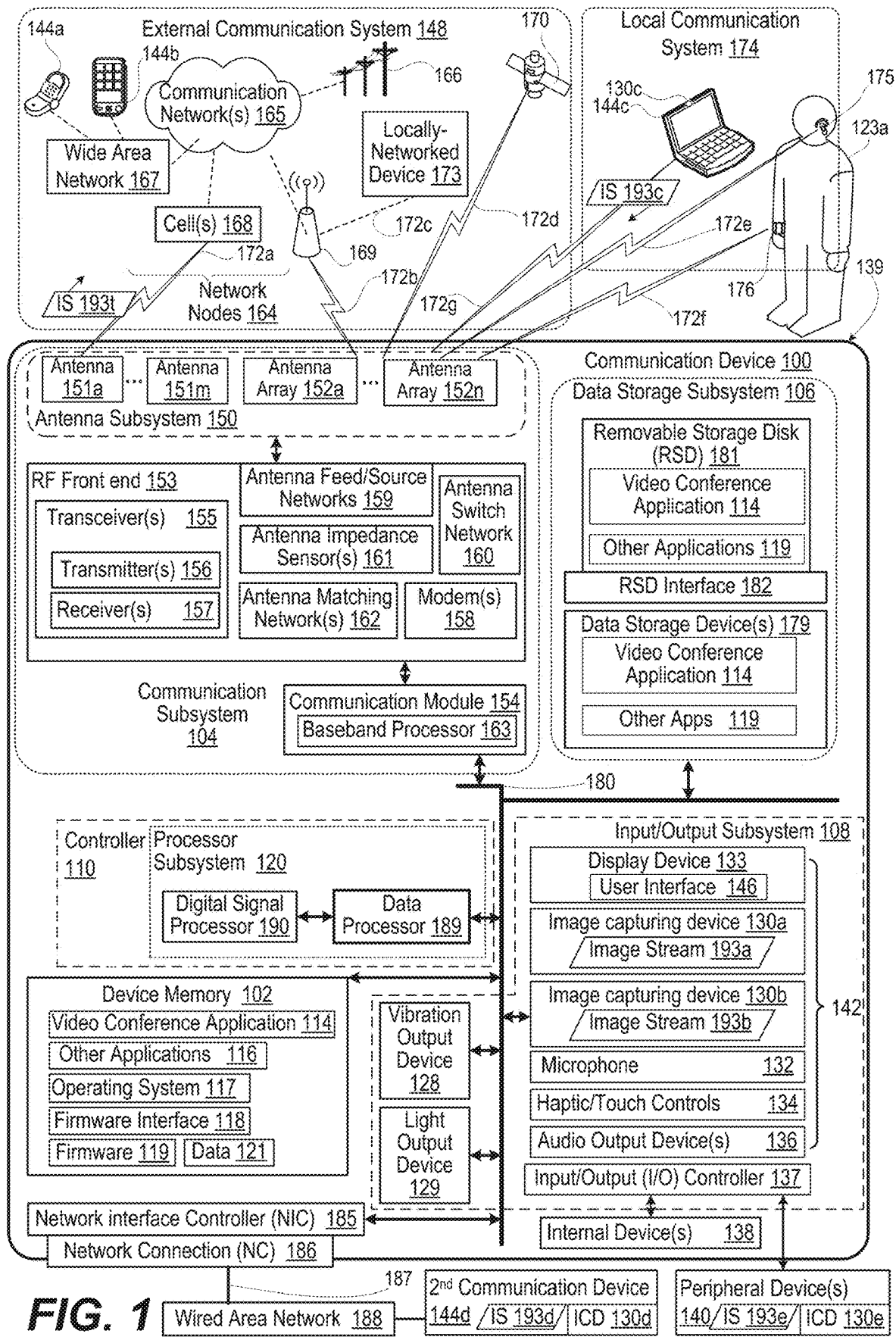
FIG. 1 depicts a functional block diagram of a communication environment including a communication device having components that prompt a local participant to gaze toward a local image capturing device during a video communication session, and within which certain of the features of the present disclosure are advantageously implemented, according to one or more embodiments.

According to a first aspect of the present disclosure, an electronic device, a computer program product, and a method are provided that, in a communication environment of using multiple user devices, prompt a participant to gaze toward a local image capturing device during a video communication session. According to one aspect, the prompt may be generated in response to detecting that the participant is speaking and/or that the participant is being presented within the video communication session. In a particular embodiment, the prompt may be generated further in response to determining that the participant's gaze is not directed towards the image capturing device.

The electronic device has at least one display device that includes a first display device. The electronic device includes at least one microphone that captures audio input and produces an audio stream. The electronic device has at least one image capturing device, including a first image capturing device that produces a first image stream. The first image capturing device is configured to be spaced away from the first display device. The first image capturing device has a field of view that incorporates a person. The electronic device includes at least one network interface that communicatively connects the electronic device via a network to at least one second electronic device during the video communication session. A controller of the electronic device is communicatively coupled to the at least one display device, the at least one microphone, the at least one image capturing device, and the at least one network interface. The controller configures the electronic device to provide functionality described herein.

In one or more embodiments, the controller receives an indication via the network from at least one second electronic device that the first image steam from the electronic device has been "pinned" or otherwise highlighted/selected and made visible to others participating in the video conference. Within these use cases, a user interface presented by a display device of at least one second electronic device is presenting the first image stream even if the person is not speaking. The indication of the local image stream being pinned or otherwise being made visible is an example of a trigger for presenting a prompt for the person to gaze toward the at least one image capturing device.

In an example, the controller communicates the first image stream, via the at least one network interface and the network, to the at least one second electronic device during the video communication session. The controller receives a second image stream, via the at least one network interface and the network, from a particular second electronic device of the at least one second electronic device. The controller presents the second image stream at the first display device. The controller monitors, via the at least one microphone, for audio input that (i) includes speech from a local participant, or (ii) is being generated locally from the area of the first electronic device and/or (iii) triggers a capturing and presenting of the video stream from the image capturing device. In response to determining that the audio input from the at least one microphone was detected includes speech or other audio that is originating from within the local area/participant, the controller presents a first prompt at the first display device indicating that the person should gaze toward the first image capturing device. The controller can access an automatic closed captioning engine that detects spoken words in the audio stream.

In one or more embodiments, a direction that a person is gazing is detected as part of detecting a trigger for presenting a prompt. A controller of the electronic device can determine that the person is not gazing toward a particular camera or image capturing device using one or more techniques such as: (i) a face of a person is not identified within an image stream; (ii) a body of a person is identified within the image stream in a turned orientation; (iii) features of a face are identified within the image stream as being turned away; (iv) the gaze of the person is detected by another camera or image capturing device that is spaced apart from the selected image capturing device for providing the image stream; (v) features of one or both eyes of the person are identified that indicate that the pupils are turned away; and (vi) a heads up display device, virtual reality device, or augmented reality device can include head and/or eye tracking sensors that can report the gaze direction. Recognition of anatomical features by the controller can be supported by a neutral network or expert system trained to recognize a generic face and other human body parts. The controller can access a library of generic shapes that can be compared to objects detected within an image stream.

In one or more embodiments, determining whether the person is speaking is detected as part of detecting a trigger for presenting a prompt. The controller of the electronic device can determine that speech is being produced by the person using one or more techniques. In an example, the controller is trained to recognize the voice characteristics of the person sufficiently to distinguish the voice from other people. In another example, the controller has access to a second (remote) audio stream in electrical form as well as audio output detected by a microphone. By comparing the two, the controller can determine whether or not the speech originated in the second audio stream that is being presented by an audio output device. In an additional example, the electronic device monitors one or more microphones that have directional acoustic sensing. The controller identifies a location of one or more of the person and the audio output device(s) and compares the location to the directional acoustic sensing. In a further example, the controller can determine that the person is listening to the second audio stream from the video communication session by a headset or earphones that are not providing audio output to the one or more microphones. The controller can determine that sounds that are recognized as human speech are being created by the person. In yet another example, the controller can monitor mouth movements by the person as captured in the first image stream. The controller can also monitor for hand, food objects or beverage containers that are detected being brought to the mouth that can indicate that speech is not occurring. In response to a mouth movements that continue for a threshold period of time, the controller can determine that the person is speaking.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, within an operating environment and within which several of the features of the present disclosure are advantageously implemented. Referring now to the specific component makeup and the associated functionality of communication device 100. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, and other application(s) 116. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100 that prompt a local participant who is speaking during a video communication session to gaze toward a local image capturing device. The software and/or firmware modules have varying functionality when their corresponding program code is executed by processor subsystem 120 or secondary processing devices within communication device 100. Processor subsystem 120 of controller 110 can execute program code of video conference application 114 and other application(s) 116 to configure communication device 100 to perform specific functions. Device memory 102 can include data 121 used by the applications.

I/O subsystem 108 includes user interface components such as vibration output device 128, light output device 129, image capturing devices 130a-130b, microphone 132, display device 133, touch/haptic controls 134, and audio output device(s) 136. In an example, image capturing devices 130a-130b are front and back cameras. In another example, image capturing devices 130a-130b are on the same side but have different lenses, such as two different ones of telephoto, wide angle, macro, or general purpose lenses. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing devices 130a-130b and to at least one user interface device 142, such as at least one microphone 132. Image capturing device 130a and user interface device 142 allows a participant using communication device 100 to be an active participant in a video communication session with a second participant using a corresponding one of second communication device(s) 144a-144d that can be similarly configured and/or provide similar functionality as communication device 100. Controller 110 is also communicatively coupled to at least one display device 133 that presents user interface 146 for the video communication session. Controller 110 executes video conference application 114 stored in device memory 102 to configure communication device 100 to enable communication with second communication device(s) 144a-144d in the video communication session. It is appreciated that second communication device(s) 144a-144d can be identically or similarly equipped with components and functionality described for communication device 100. According to aspects of the present disclosure, communication device 100 can be communicatively coupled to one or more of image capturing devices ("ICC") 130c-130e respectively provided, for example, by communication devices 144c/144d and peripheral device 140.

Each of communication device 100 and second communication device(s) 144a-144d can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication sub system 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 used by antenna subsystem 150. The received signal is amplified and filtered by receiver(s) 157, which demodulate received encoded data from a received carrier signal. Antenna feed/source networks 159 transmit or receive from elements of antenna subsystem 150 and can adjust a phase between elements of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining elements of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100 and second communication device(s) 144a/144b. The particular network nodes 164 can be cellular "cells", base nodes, or base stations 168 that support cellular OTA communication using radio access technology (RAT) utilized by a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication sub system 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by local participant 123a. In one or more particular embodiments, communication subsystem 104 communicates with second communication device(s) 144c via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 116 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other application(s) 116.

In one or more embodiments, I/O subsystem 108 includes network interface controller (NIC) 185 with a network connection (NC) 186 on housing 139. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. Second communication devices 144*d* is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors 190 that are integrated with data processor 189. Processor subsystem 120 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

In one aspect, communication device 100 can function as a "transmitting device", selecting between locally obtained image stream 193*a*-193*d* to communicate to one or more second communication device(s) 144*a*-144*b* that function as "receiving device(s)" for remote participants. In an example, image capturing devices 130*a*-130*b* of communication device 100 can provide at least two image streams 193*a*-193*b* respectively. In another example, at least one of second communication device(s) 144*c*-144*d* is available locally to communication device 100 to provide a respective image streams 193*c*-193*d* from corresponding image capturing devices 130*c*-130*d* to controller 110. In an additional example, peripheral device 140 has image capturing device 130*e* that provides image stream 193*e* to controller 110. Controller 110 configures communication device 100 and the communicatively connected one or more second communication device(s) 144*c*-144*e* and peripheral device 140 to perform functionality described herein for prompting a participant, e.g., a participant who is speaking, during a video communication session to gaze toward one local image capturing device 130*a*-130*e*. In an example, controller 110 executes video conference application 114 stored in a computer readable medium such as device memory 102 to automatically generate prompts to gaze toward one image capturing device (130*a*-130*e*).

Figure 2:
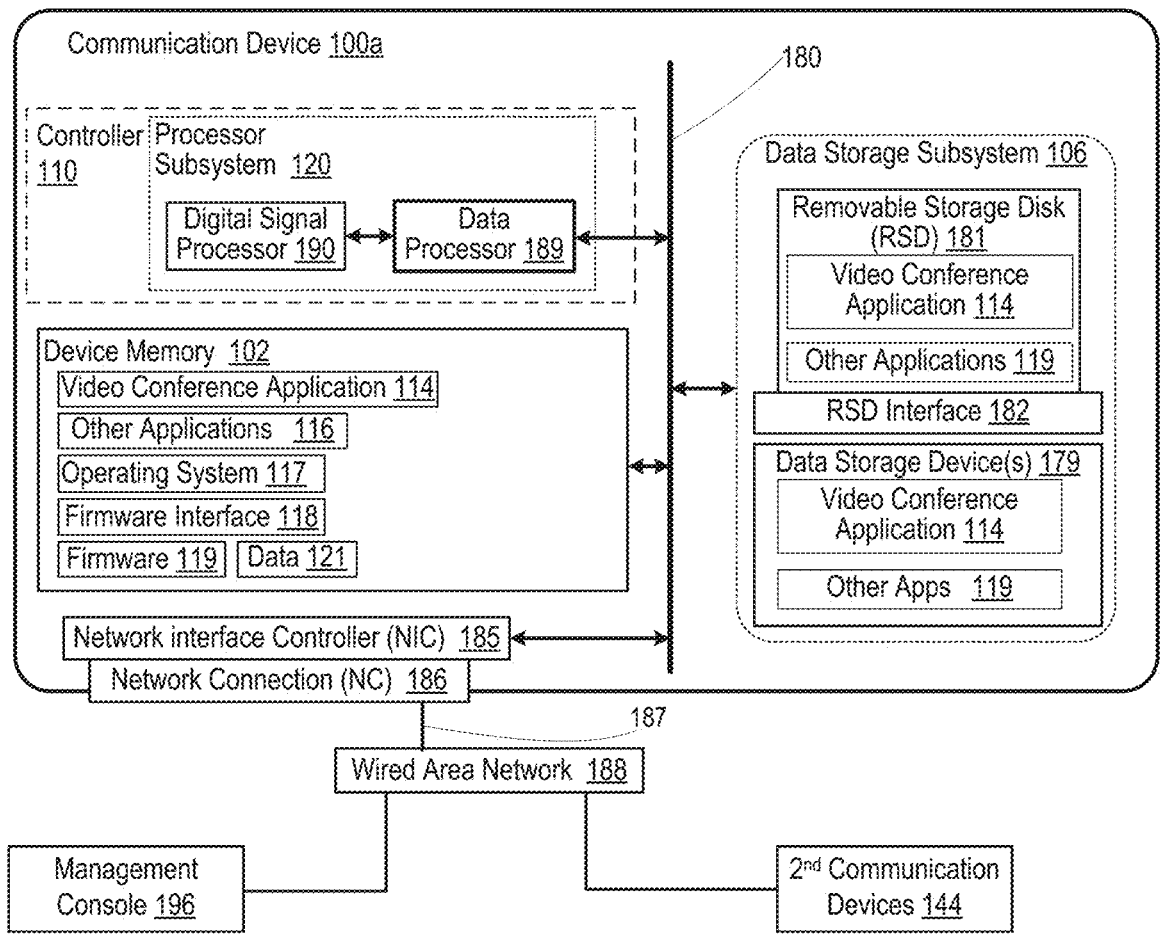
FIG. 2 depicts a functional block diagram of a communication environment including a network server that prompt participants who are speaking during a video communication session to gaze toward a local image capturing device, and within which certain of the features of the present disclosure are advantageously implemented, according to one or more embodiments.

FIG. 2 depicts a functional block diagram of a communication environment including communication device 100*a* configured as a network server and which prompts participants to gaze toward a local image capturing device during a video communication session, and within which the features of the present disclosure are advantageously implemented. In one or more embodiments, communication device 100*a* can have similar or identical components to communication device 100, with certain components unused or removed to enable communication device 100*a* to function as a network server. In one or more embodiment, communication device 100*a* is configured as a network server having controller 110 that manages device memory 102, data storage subsystem 106, and NIC 185. Management console 196 can periodically communicatively connect to communication device 100*a* via wired area network 188 to configure program code such as video conference application 114 and data 121. Controller 110 executes video conference application 114 to configure communication device 100*a* to facilitate one or more communication sessions for second communication devices 144.

Figure 3:
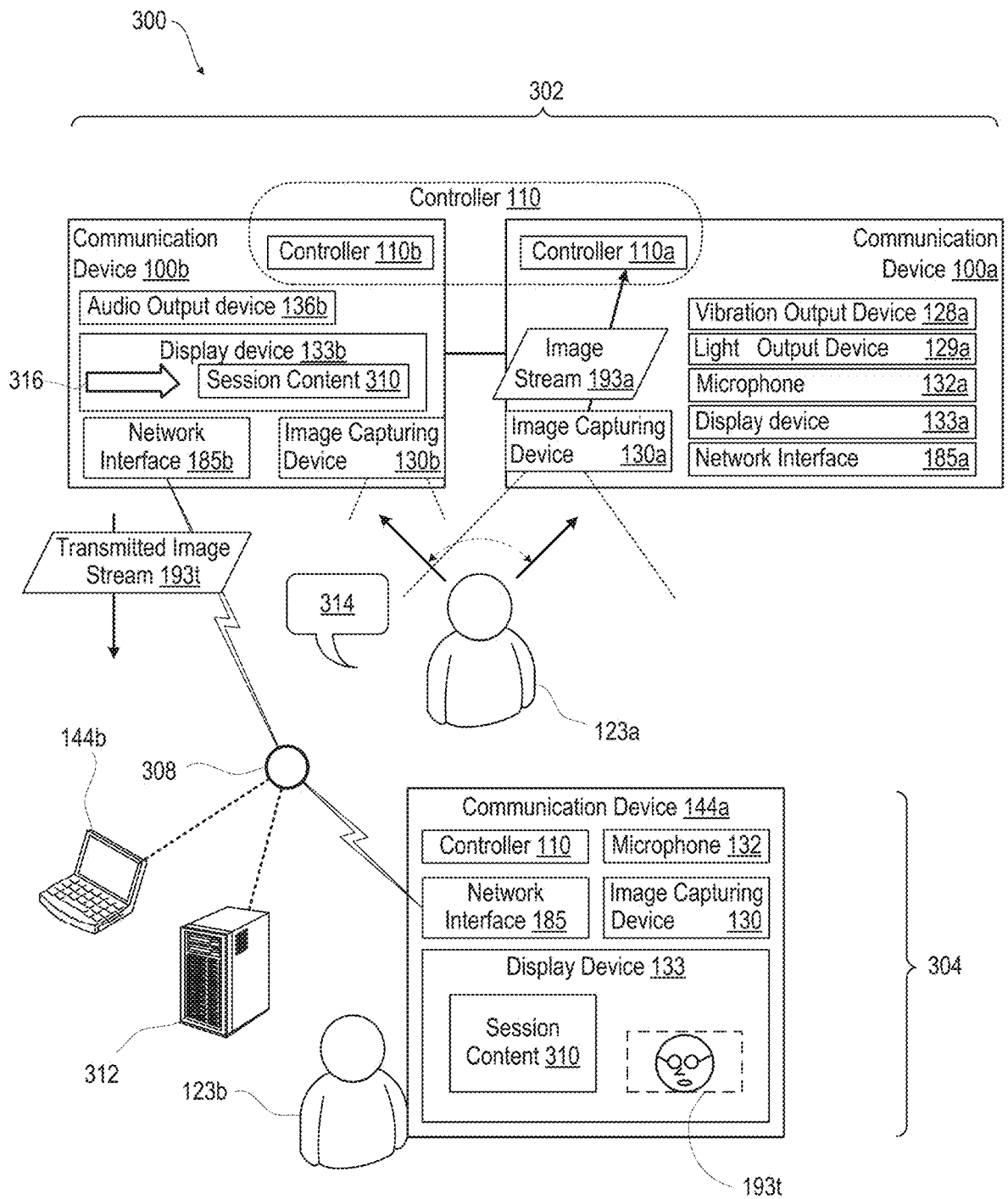
FIG. 3 depicts a functional block diagram of a communication environment including two local communication devices that automatically communicates an image stream to a receiving communication device during a video communication session, according to one or more embodiments.

FIG. 3 depicts a functional block diagram of communication environment 300 including two local communication devices 100*a*-100*b* that automatically communicates image stream to a receiving communication device during a video communication session. Communication devices 100*a*-100*b* are local environment 302 within communication environment 300 and act as transmitting devices. Remote environment 304 includes second communication device 144 that acts as a receiving device. In an example, communication device 100*a* includes controller 110*a*, vibration output device 128, light output device 129, image capturing device 130*a*, microphone 132*a*, display device 133*a*, and network interface 185*a*. Communication device 100*a* has image capturing device 130*a* positioned to have a field of view (FOV) that incorporates, in image stream 193*a*, local participant 123*a*. Communication device 100*b* includes controller 110*b*, image capturing device 130*b*, display device 133*b*, audio output device 136*b*, and network interface 185*b*. Communication device 100*b* can have image capturing device 130*b*. One or both of controllers 110*a*-110*b* manage the functionality described herein to function as controller 110. In an example, controller 110*a* of communication device 100*a* receives image stream 193*a* that is communicated as transmitted image stream 193*t* via network interface 185*b* and network 308.

Network 308 can include one or more wired and wireless communication channels that communicatively connect communication devices 100*a*-100*b* to remote environment 304 of communication environment 300. Remote environment 304 includes at least one second communication device 144 having display device 133 that presents transmitted image stream 193 for viewing by remote participant 123*b*. In an example, second communication device(s) 144*a* is similarly equipped with controller 110, image capturing device 130, microphone 132, and network interface 185 to enable two-way audiovisual participation in the video communication session. Display device 133 of second communication device 144 presents session content 310, such as from network server 312 or other second communication devices 144*b*. When local participant 123*a* speaks or a locally generated sound is detected by microphone 132, display device 133 of second communication device(s) 144*a* presents transmitted image stream 193*t*.

Local environment 302 includes two local communication devices 100*a*-100*b* that are communicatively coupled to operate together during a video communication session for capture and communication of image stream 193 from image capturing device 130*a* of communication device 100*a*. Communication devices 100*a*-100*b* can be communicatively linked via one or more wired or wireless connections described herein. Local communication devices 100*a*-100*b* are also communicatively connected to receive session content 310 from one or more of second communication device(s) 144*a*-144*b* and network server 312 during the video communication session that is presented on display device 133*b* of communication device 100*b*. By having two different communication devices 100*a*-100*b*, local participant 123*a* can benefit from image capturing device 130*a* of communication device 100*a* that is better than image capturing device 130*b* of communication device 100*b*. Local participant 123*a* can also benefit from display device 133*b* of communication device 100*b*. In an example, communication device 100*a* can have display device 133*a* that is turned away from local participant 123*a* in order to enable use of image capturing device 130*a* that is positioned on an opposite side. In another example, display device 133*a* of communication device 100*a* is smaller than display device 133*b* of communication device 100*b*.

Communication devices 100*a*-100*b* are sufficiently spaced apart that local participant 123*a*, whose image is incorporated in transmitted image stream 193*t* is easily recognized as gazing away from image capturing device 130*a* when gazing at display device 133*b*. Controller 110 can detect that local participant 123*a* is producing speech 314 or that an environmental sound is detected that will result in transmitted image stream 193*t* being viewed by remote participant 123*b* at second communication device(s) 144*a*. To improve an apparent eye-to-eye contact between local participant and the viewers on the video communication session, controller 110 causes one or more prompts to be presented to local participant 123*a*, such as displayed prompt 316 presented at/on display device 133*b*. In another example, controller 110 activates one or more of vibration output device 128*a* and light output device 129*a* at communication device 100*a* to present the prompt to local participant 123*a*.

Figure 4:
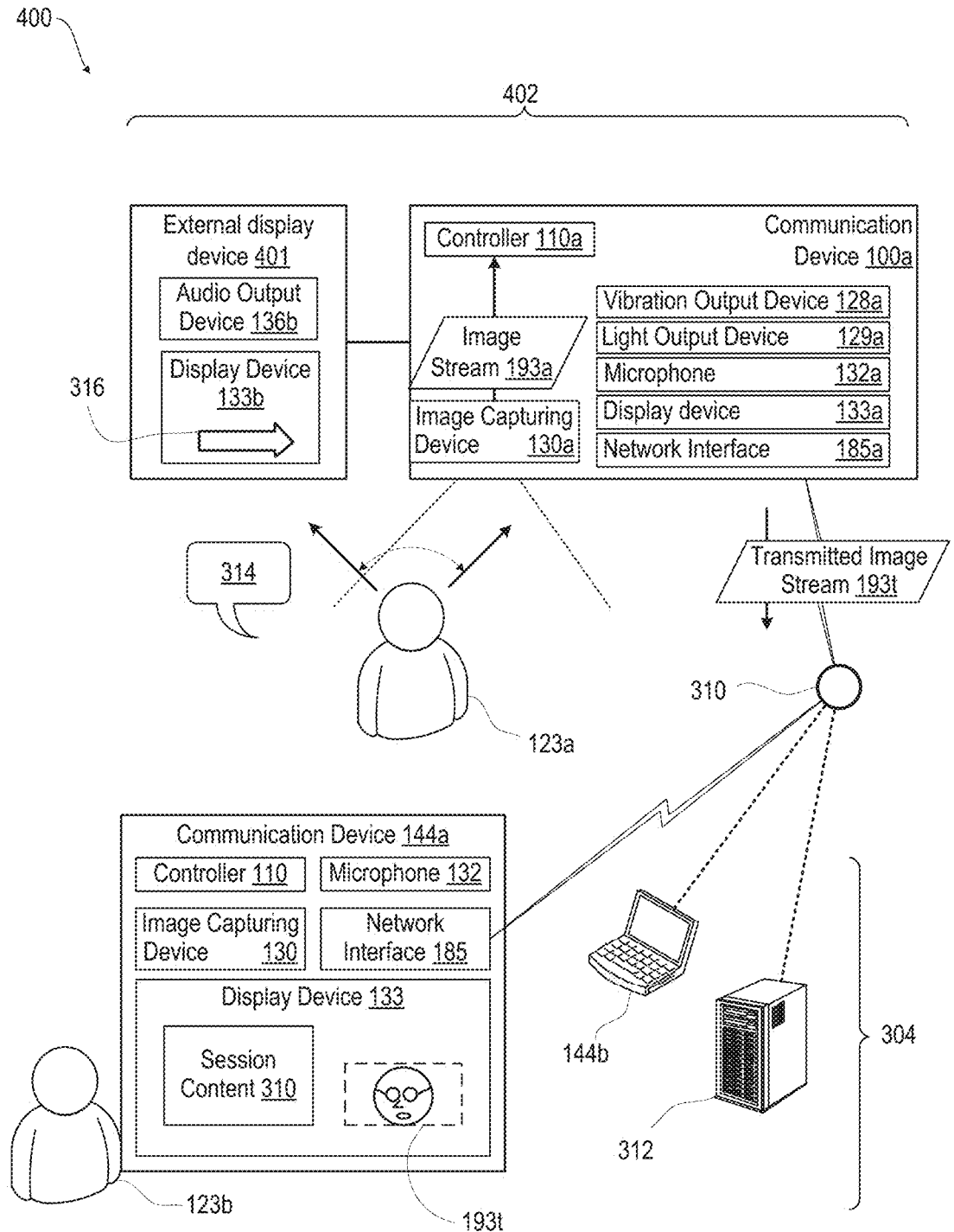
FIG. 4 depicts a functional block diagram of a communication environment including a local communication device that is augmented by an external display device and that automatically communicates an image stream to a receiving communication device during a video communication session, according to one or more embodiments.
Figure 5:
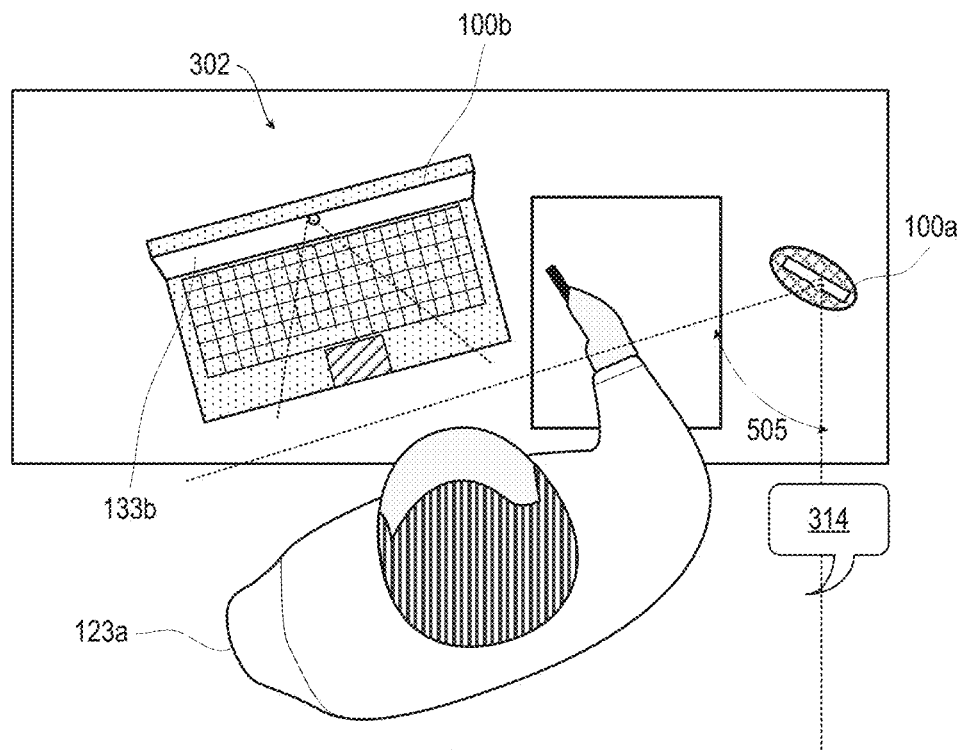
FIG. 5 depicts a top view of an example communication environment having a local (transmitting) environment that includes a first communication device that provides an image capturing device positioned to have a field of view (FOV) of a local participant and that includes a second communication device that provides a display device, according to one or more embodiments.

FIG. 4 depicts a functional block diagram of communication environment 400 including local communication device 100*a* that is augmented by external display device 401. External display device 401 and communication device 100*a* provide local environment 402 of communication environment 400. Communication environment 400 also includes remote environment 304 as previously described. Controller 110*a* presents audio content on one or both of audio output devices 136*a*-136*b*. Controller 110*a* presents visual content on one or both of display devices 133*a*-133*b*. Controller receives image stream 193*a* from image capturing device 130*a* and communicates transmitted image stream 193*t* to remote environment 304 of communication environment. In response to detecting speech 314 by local participant 123*a* or ambient sound sufficient to trigger the image capture device to begin to transmit transmitted image stream 193*t*, controller 110*a* prompts local participant 123*a* to gaze at image capturing device 130*a* by one or more of: (i) presenting displayed prompt 316 on display device 133*b*; (ii) presenting session content 310 on display device 133*a*; (iii) activating vibration output device 128*a*; (iv) activating light output device 129*a*;

FIG. 5 depicts a top view of example (transmitting) local environment 302 of example communication environment 300 (FIG. 3) having communication device 100*a* that provides image capturing device 130*a* positioned to have FOV 505 of local participant 123*a*. Example communication environment 300 has communication device 100*b*, depicted as a laptop, that provides display device 133*b* that local participant 123*a* is gazing at. Communication device 100*a* detects speech 314 from local participant 123*a*.

Figure 6:
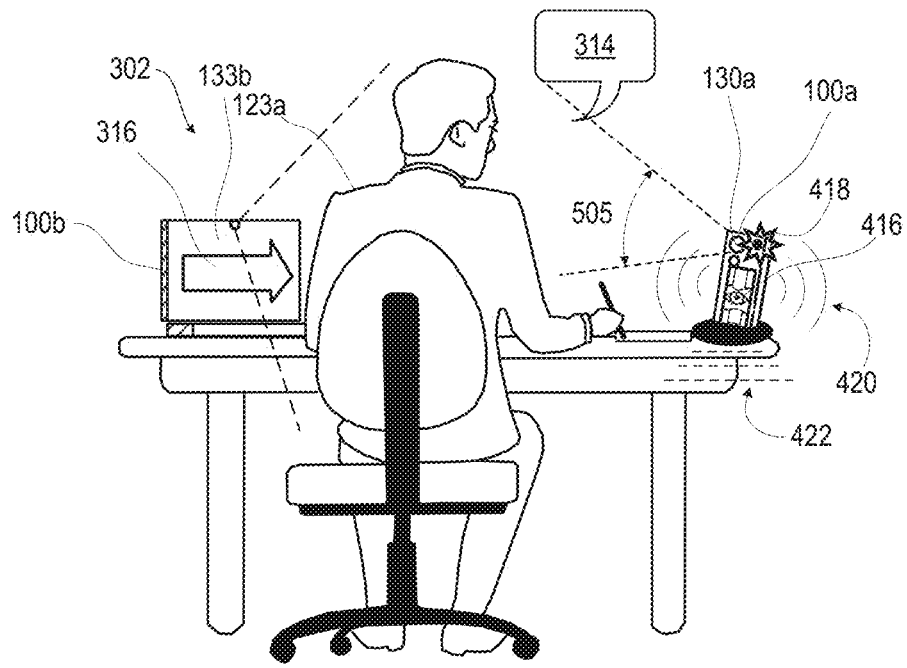
FIG. 6 depicts a front view of the local (transmitting) environment of the example communication environment of FIG. 3 having the first and the second communication devices prompting the local participant to gaze toward the image capturing device while speaking, according to one or more embodiments.

FIG. 6 depicts a front view of (transmitting) local environment 302 of example communication environment 300 (FIG. 3) after controller has successfully prompted participant 123*a* within FOV 505 to gaze toward image capturing device 130*a* of communication device 100*a*. Display device 133*b* of communication device 100*b* presents displayed prompt 316. Communication device 100*a* presents one or more one or more of: (i) displayed prompt 416; (ii) light prompt 418; (iii) audible prompt 420; and (iv) vibration prompt 422 that prompted local participant to gaze toward image capturing device while speaking.

Figure 7:
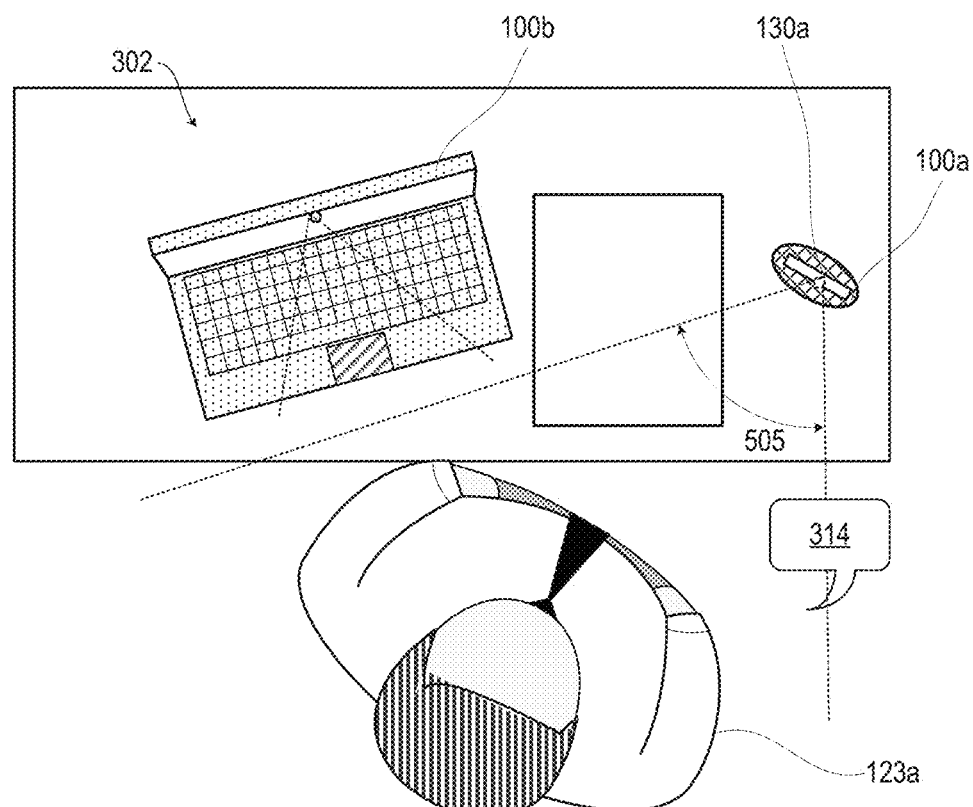
FIG. 7 depicts a top view of the local (transmitting) environment of the example communication environment of FIG. 3 that provides an image stream, to the video communication session, of the local participant after responding to a prompt to gaze toward the image capturing device of the first communication device, according to one or more embodiments.

FIG. 7 depicts a top view of example (transmitting) local environment 302 of example communication environment 300 (FIG. 3). Local participant 123*a* within FOV 505 is turned facing image capturing device 130*a* of communication device 100*a*. Controller 110*a* discontinue the prompts in response to confirming that local participant 123*a* is gazing toward communication device 100*a*. Alternatively, communication device 100*a* can monitor one or more of mouth movements by local participant 123*a* and detected speech by local participant 123*a* to determine when to discontinue prompts.

Figure 8A:
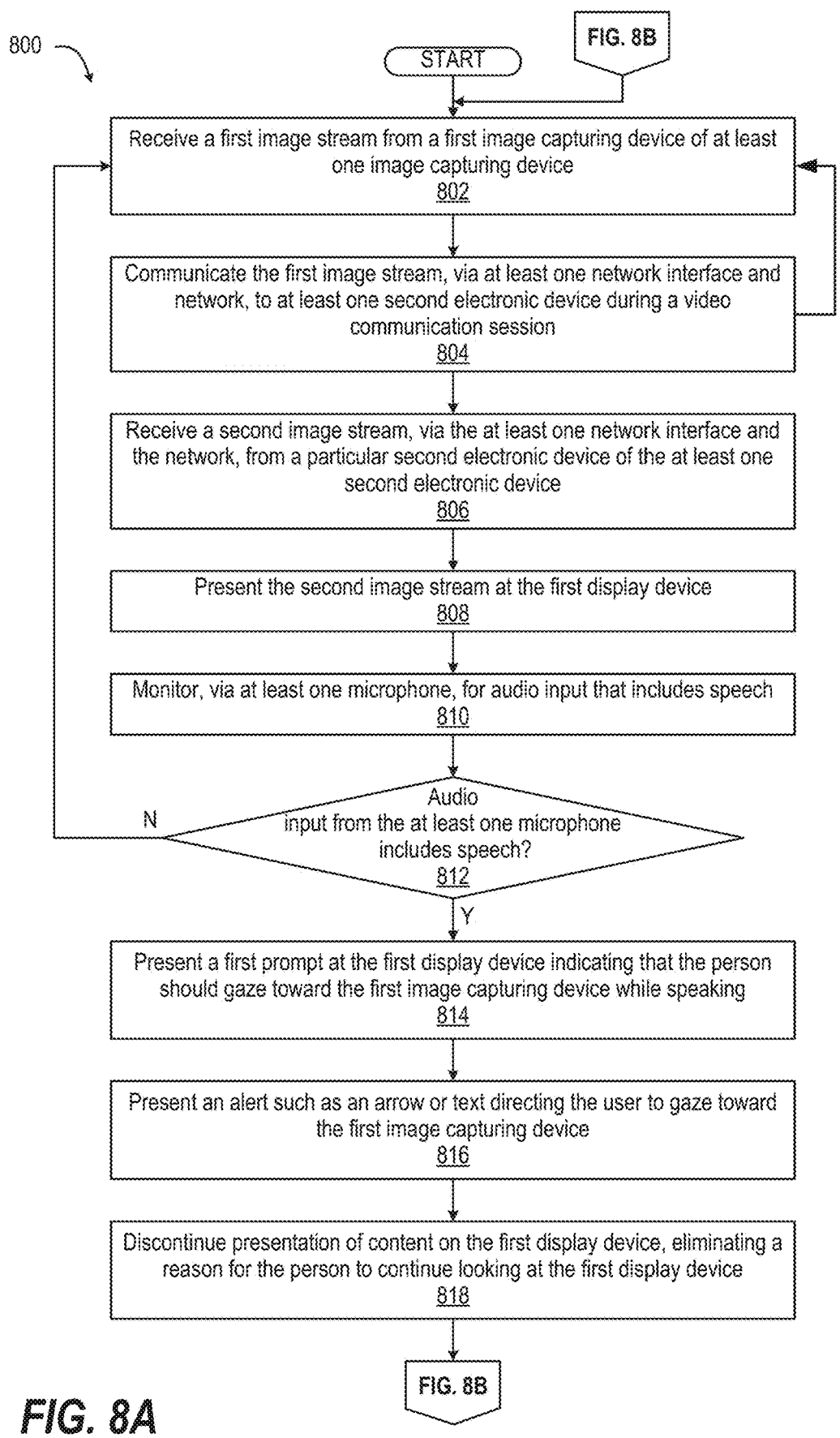
FIGS. 8A-8B (collectively FIG. 8) depict a flow diagram of a method for prompting a participant to gaze toward a local image capturing device during a video communication session in response to a local person speaking, according to one or more embodiments.
Figure 8B:
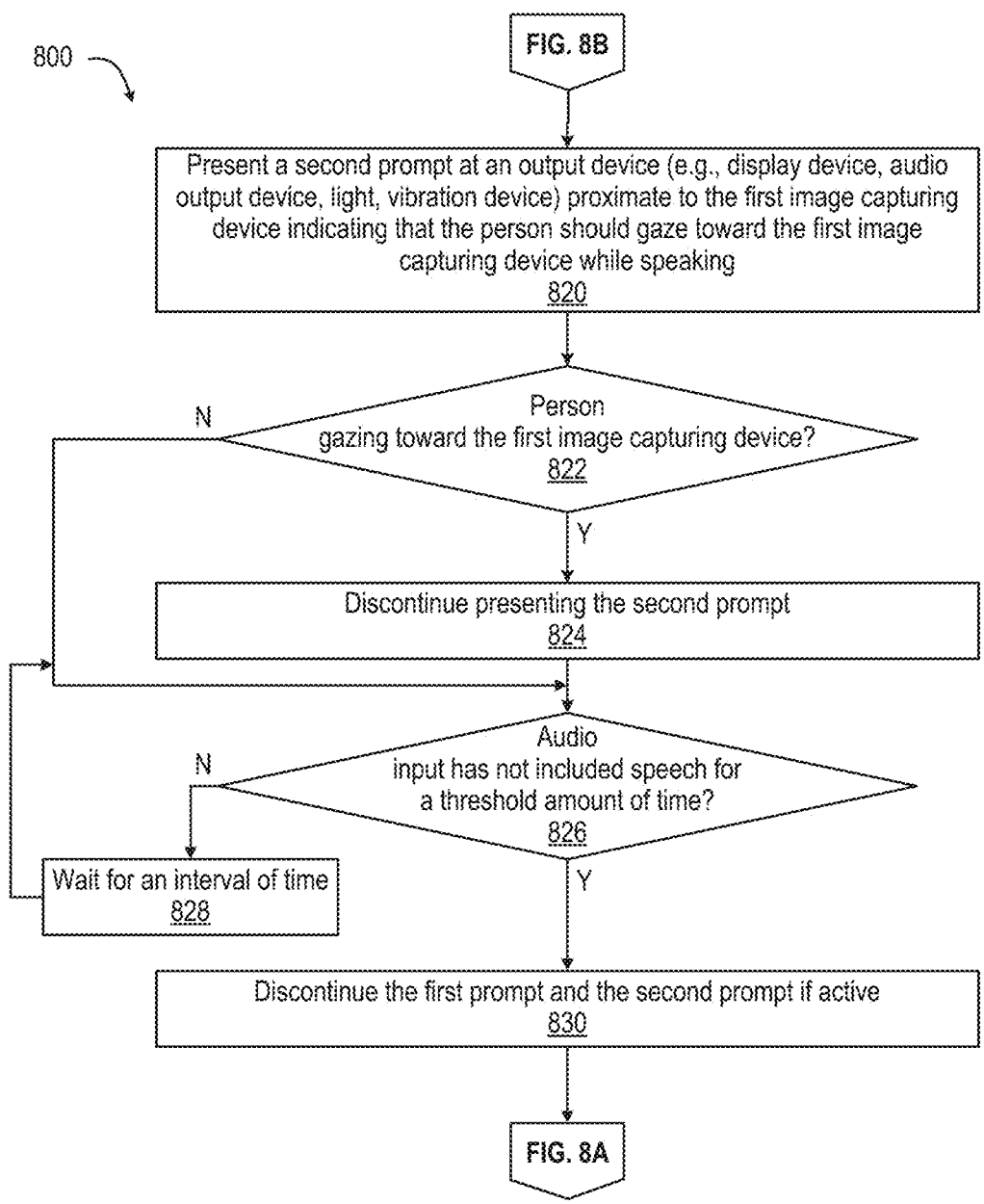
Figure 9:
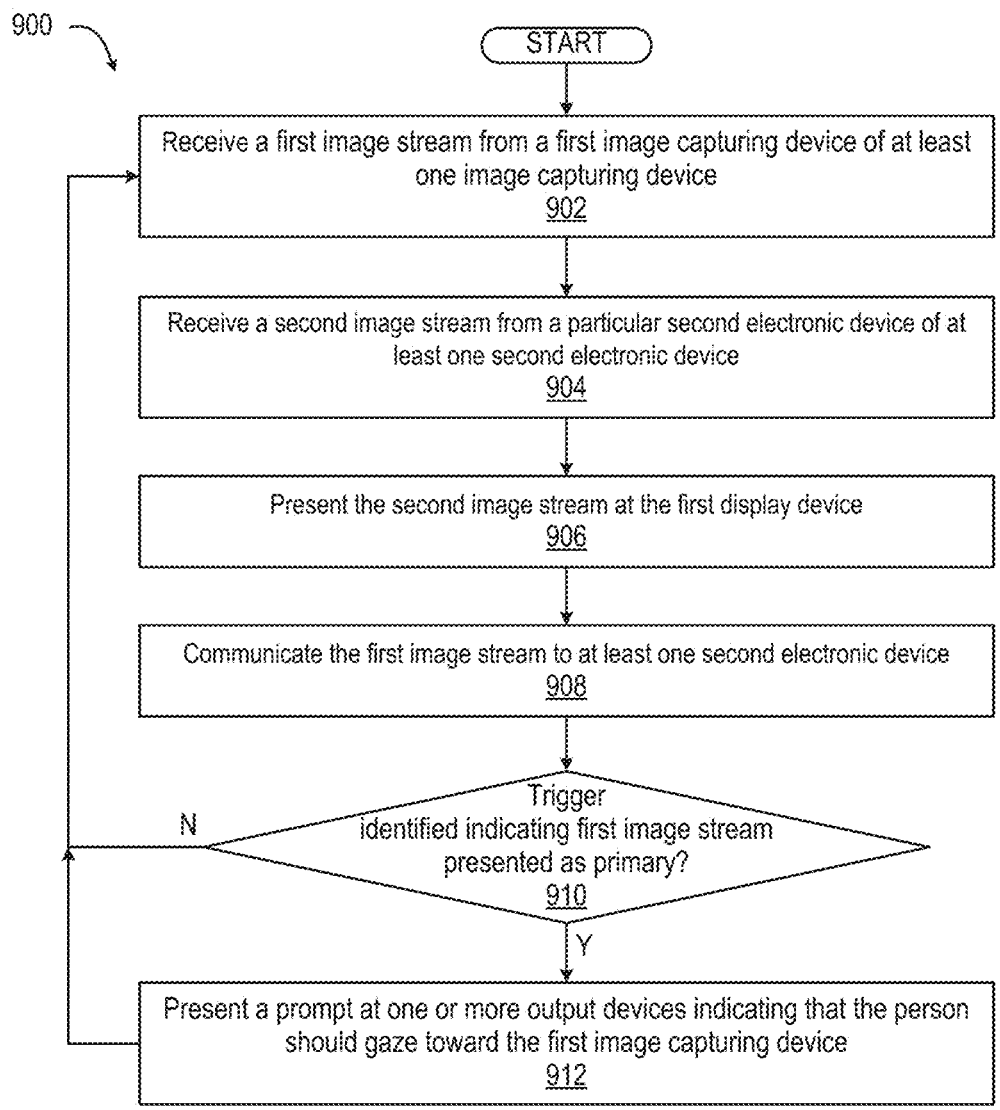
FIG. 9 depicts a flow diagram of a method for prompting a participant to gaze toward a local image capturing device in response to an indication that the local person is being presented in a primary image stream to the video communication session, according to one or more embodiments.

FIGS. 8A-8B (collectively FIG. 8) depict a flow diagram of a method for prompting a participant to gaze toward a local image capturing device during a video communication session in response to a local person speaking. In at least one embodiment, communication device 100, managed by controller 110, executes video conference application 114, configuring communication device 100 (FIG. 1) to facilitate a video communication session that includes functionality described for method 800 as well method 900 (FIG. 9). The description of methods 800/900 is provided with general reference to the specific components illustrated within the preceding FIGS. 1-7, and specific components referenced in methods 800/900 may be identical or similar to components of the same name used in describing preceding FIGS. 1-7.

With reference to FIG. 8A, method 800 includes receiving a first image stream from a first image capturing device of at least one image capturing device (block 802). The first image capturing device is configured to be spaced away from a first display device of at least one display device. The first image capturing device has a field of view that incorporates a person. Method 800 includes communicating the first image stream, via at least one network interface and network, to at least one second electronic device during a video communication session (block 804). Method 800 includes receiving a second image stream, via the at least one network interface and the network, from a particular second electronic device of the at least one second electronic device (block 806). Method 800 includes presenting the second image stream at the first display device (block 808). Method 800 includes monitoring, via at least one microphone, for audio input that includes speech (block 810). Method 800 includes determining whether the audio input from the at least one microphone includes speech (decision block 812). In response to determining that the audio input from the at least one microphone does not include speech, method 800 returns to block 802. In response to determining that the audio input from the at least one microphone includes speech, method 800 includes presenting a first prompt at the first display device indicating that the person should gaze toward the first image capturing device while speaking (block 814). In one or more embodiments, method 800 includes presenting an alert such as an arrow or text directing the user to gaze toward the first image capturing device (block 816). In one or more embodiments, method 800 includes discontinuing presentation of content on the first display device, eliminating a reason for the person to continue looking at the first display device (block 818).

Method 800 continues with reference to FIG. 8B. Method 800 includes presenting a second prompt at an output device (e.g., display device, audio output device, light, vibration device) proximate to the first image capturing device indicating that the person should gaze toward the first image capturing device while speaking (block 820). In an example, a user interface on the second display device proximate to and oriented in a same direction as the image capturing device can present the second image stream for viewing by the person. In an example, the person can view an image of the remote person, encouraging a person-to-person conversation. In another example, visual aids can be presented for the person to reference. In one or more embodiment, method 800 includes determining whether the person is gazing toward the first image capturing device (decision block 822). In response to determining that the person is not gazing toward the first image capturing device, method 800 proceeds to decision block 826. In response to determining that the person is gazing toward the first image capturing device, method 800 discontinues presenting the second prompt (block 824). As an example, the second prompt is no longer presented because the second prompt has accomplished the desired objective of having the person look at the first image capturing device, which is the source of the first image stream begin transmitted. When the person looks towards the prompts presented at a second electronic device, the person will appear to be making eye-to-eye contact with the remote person. Once the objective of directing the person's gaze towards the image capturing device is achieved, controller 110 (FIG. 1) removes the second prompt (e.g., stops presentation of a flashing light, audio tone, or vibration) to eliminate an unnecessary distraction while the person is speaking or connecting with the other participants on the video communication session.

From decision block 822 or from block 824, method 800 includes determining whether the audio input from the at least one microphone has not included speech for a threshold amount of time (decision block 826). In response to determining that the audio input from the at least one microphone has included speech within the threshold amount of time, method 800 includes waiting for an interval of time (block 828). Then method 800 returns to decision block 826. In response to determining that the audio input from the at least one microphone has not included speech for the threshold amount of time, method 800 includes discontinuing the first prompt and the second prompt (block 830). Then method 800 returns to block 802 (FIG. 8B).

FIG. 9 depicts a flow diagram of method 900 for prompting a participant to gaze toward a local image capturing device in response to indication that the local person is being presented in a primary image stream to the video communication session. Method 900 includes receiving a first image stream from a first image capturing device of at least one image capturing device (block 902). The first image capturing device is configured to be spaced away from a first display device of at least one display device. The first image capturing device has a field of view that incorporates a person. Method 900 includes receiving a second image stream, via the at least one network interface and the network, from a particular second electronic device of the at least one second electronic device (block 904). Method 900 includes presenting the second image stream at the first display device (block 906).

Method 900 includes communicating the first image stream, via at least one network interface and network, to at least one second electronic device during a video communication session (block 908). In one or more embodiments, method 900 includes monitoring a second image capturing device that produces a third image stream. Second image capturing device is configured to be proximate to the first display device. However, the controller does not select to communicate the third image stream to the video communication session. In an example, the first image stream incorporates more of a face of the person than the third image stream. In another example, the first image stream incorporates the person while the third image stream does not incorporate the person. In a further example, the first image stream provides a qualitatively better image of the person than the third image stream.

Method 900 includes determining whether a trigger is identified that indicates, or is associated with, the first image stream being presented as a primary image stream by the at least one second electronic device (decision block 910). In an example, a user interface presented for the video communication session can respond to a particular person being assigned to be presenter by presenting the first image stream. When not assigned, another image stream is presented. In another example, the number of participants is small enough that the person that the person is presented along with other image streams. When the local participant is not speaking or expected to speak, a presumption can be made that remote participants are not focused on the first image stream. In an additional example, the first image stream can be replaced with a substitute image stream during a portion of the video communication session. Turning back on the first communication stream can be the trigger. In response to determining that the trigger has not been identified that indicates that the first image stream is being presented as a primary image stream by the at least one second electronic device, method 900 returns to block 902.

In response to the trigger that indicates that the first image stream is being presented as a primary image stream by the at least one second electronic device, method 900 includes presenting a prompt at one or more output devices (e.g., first display, second display, light output device, vibration output device, audio output device) indicating that the person should gaze toward the first image capturing device (block 912). Then method 900 returns to block 902.

In one or more embodiments, method 900 includes presenting the prompt indicating that the person should gaze at the first image capturing device by: (i) presenting at least one of the first image stream and the second image stream at a second display device proximate to the first image capturing device; and (ii) discontinuing presentation of the at least one of the first image stream and the second image stream on the first display device. In one or more alternative embodiments, method 900 further includes identifying the first image stream whether the person is gazing toward the first image capturing the device and presenting the prompt further in response to determining that the person is not gazing toward the first image capturing device.

In one or more embodiments, method 900 includes receiving a first image stream from a first image capturing device of at least one image capturing device, the first image capturing device configured to be spaced away from a first display device of at least one display device. The first image capturing device has a field of view that incorporates a person. Method 900 includes communicating the first image stream, via at least one network interface and network, to at least one second electronic device during a video communication session. Method 900 includes receiving a second image stream, via the at least one network interface and the network, from a particular second electronic device of the at least one second electronic device. Method 900 includes presenting the second image stream at the first display device. In response to a trigger that indicates that the first image stream is being presented as a primary image stream by the at least one second electronic device, method 900 includes presenting a prompt at the at least one output device indicating that the person should gaze toward the first image capturing device.

In one or more embodiments, method 900 further includes monitoring, via at least one microphone, for the audio input that includes speech. In response to determining that the audio input from the at least one microphone includes speech above a preset threshold, method 900 includes determining whether the speech is being produced by the person. Method 900 includes identifying the speech as the trigger in response to determining that the speech is being produced by the person. In one or more particular embodiments, method 900 further includes determining whether the speech is being produced by the person comprises identifying one or more of: (i) a mouth of the person moving within a current image stream; (ii) the speech not originating from a first audio stream received from at least one second device and being outputted by a speaker; and (iii) a source direction of the speech corresponds to a location of the person.

In one or more embodiments, method 900 further includes identifying the trigger by identifying at least one of: (i) a user selected toggle of a video sharing control that communicates the first image stream to be communicated as a primary image stream to the at least one second electronic device during the video communication session; and (ii) an indication received from the video communication session that the first image stream is being presented at one of the at least one second electronic device.

In one or more embodiments, method 900 further includes monitoring a second image capturing device that produces a third image stream. Method 900 includes presenting the prompt for the person to gaze at the first image capturing device in response to identifying one of: (i) the first image stream incorporates more of a face of the person than the third image stream; (ii) the first image stream incorporates the person while the third image stream does not incorporate the person; and (iii) the first image stream provides a qualitatively better image of the person than the third image stream.

In one or more embodiments, method 900 further includes presenting the prompt indicating that the person should gaze at the first image capturing device by: (i) presenting at least one of the first image stream and the second image stream at a second display device proximate to the first image capturing device; and (ii) discontinuing presentation of the at least one of the first image stream and the second image stream on the first display device. In one or more embodiments, method 900 further includes presenting the prompt at one or more of an audio output device, a light output device, and a vibration output device. In one or more embodiments, method 900 further includes identifying from the first image stream that the person is not gazing toward the first image capturing the device; and presenting the prompt further in response to determining that the person is not gazing toward the first image capturing device.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one output device, including a first display device;
   at least one image capturing device, including a first image capturing device that produces a first image stream that incorporates a person;
   at least one network interface that communicatively connects the electronic device via a network to at least one second electronic device during a video communication session; and
   a controller communicatively coupled to the at least one output device, the at least one microphone, the at least one image capturing device, and the at least one network interface, and which:
      communicates the first image stream, via the at least one network interface and the network, to the at least one second electronic device during the video communication session;
      determine that speech is being produced by the person, wherein the controller identifies one or more of: (i) a mouth of the person moving within a current image stream; (ii) the speech being outputted by a speaker and not originating from a first audio stream received from at least one second device; and (iii) a source direction of the speech corresponds to a location of the person; and
      in response to a trigger that indicates that the first image stream is being presented as a primary image stream by the at least one second electronic device, the trigger comprising the speech being produced by the person, presents a prompt at the at the at least one output device indicating that the person should gaze toward the first image capturing device.

2. The electronic device of claim 1, further comprising:
   at least one microphone that captures audio input and produces a first audio stream;
   wherein the trigger comprises detection, by the at least one microphone, of audio input that includes speech above a preset threshold, and the controller:
      monitors, via the at least one microphone, for the audio input that includes speech;
      in response to determining that the audio input from the at least one microphone includes speech, determines whether the speech is being produced by the person; and
      identifies the speech as the trigger in response to determining that the speech is being produced by the person.

3. The electronic device of claim 1, wherein, in identifying the trigger, the controller identifies at least one of: (i) a user selected toggle of a video sharing control that communicates the first image stream to be communicated as a primary image stream to the at least one second electronic device during the video communication session; and (ii) an indication received from the video communication session that the first image stream is being presented at one of the at least one second electronic device.

4. The electronic device of claim 1, wherein:
   the controller receives a second image stream, via the at least one network interface and the network, from a particular second electronic device of the at least one second electronic device;
   the at least one image capturing device includes a second image capturing device that is communicatively coupled to the controller and produces a third image stream; and
   the controller presents the prompt to the person to gaze at the first image capturing device in response to identifying one of: (i) the first image stream incorporates more of a face of the person than the third image stream; (ii) the first image stream incorporates the person while the third image stream does not incorporate the person; and (iii) the first image stream provides a qualitatively better image of the person than the third image stream.

5. The electronic device of claim 1, wherein:
   the at least one output device comprises a second display device communicatively coupled to the controller and proximate to the first image capturing device; and
   the controller presents the prompt at the second display device indicating that the person should gaze toward the one of the second display device and the first image capturing device, wherein the controller:
      presents at least one of the first image stream and the second image stream at the second display device; and
      discontinues presenting the at least one of the first image stream and the second image stream on the first display device.

6. The electronic device of claim 1, wherein:
   the at least one output device further comprise at least one of: (i) a light output device; (ii) an audio output device; and (iii) a vibration output device that are communicatively coupled to the controller; and
   the controller presents the prompt at one or more of the audio output device, the light output device, and the vibration output device.

7. The electronic device of claim 1, wherein the controller:
   identifies from the first image stream that the person is not gazing toward the first image capturing device; and
   presents the prompt further in response to determining that the person is not gazing toward the first image capturing device.

8. A method comprising:
receiving a first image stream from a first image capturing device of at least one image capturing device, the first image capturing device having a field of view that incorporates a person;
communicating the first image stream, via at least one network interface and network, to at least one second electronic device during a video communication session;
determining that speech is being produced by the person by identifying one or more of: (i) a mouth of the person moving within a current image stream; (ii) the speech being outputted by a speaker and not originating from a first audio stream received from at least one second device; and (iii) a source direction of the speech corresponds to a location of the person; and
in response to a trigger that indicates that the first image stream is being presented as a primary image stream by the at least one second electronic device, the trigger comprising the speech being produced by the person, presenting a prompt at the at least one output device indicating that the person should gaze toward the first image capturing device.

9. The method of claim 8, further comprising:
monitoring, via at least one microphone, for the audio input that includes speech;
in response to determining that the audio input from the at least one microphone includes speech above a preset threshold, determining whether the speech is being produced by the person; and
identifying the speech as the trigger in response to determining that the speech is being produced by the person.

10. The method of claim 8, wherein identifying the trigger comprises identifying at least one of: (i) a user selected toggle of a video sharing control that communicates the first image stream to be communicated as a primary image stream to the at least one second electronic device during the video communication session; and (ii) an indication received from the video communication session that the first image stream is being presented at one of the at least one second electronic device.

11. The method of claim 8, further comprising:
receiving a second image stream from a particular second electronic device of the at least one second electronic device;
monitoring a second image capturing device that produces a third image stream; and
presenting the prompt for the person to gaze at the first image capturing device in response to identifying one of: (i) the first image stream incorporates more of a face of the person than the third image stream; (ii) the first image stream incorporates the person while the third image stream does not incorporate the person; and (iii) the first image stream provides a qualitatively better image of the person than the third image stream.

12. The method of claim 8, wherein presenting the prompt indicating that the person should gaze at the first image capturing device comprises:
presenting at least one of the first image stream and the second image stream at a second display device proximate to the first image capturing device; and
discontinuing presentation of the at least one of the first image stream and the second image stream on the first display device.

13. The method of claim 8, further comprising presenting the prompt at one or more of an audio output device, a light output device, and a vibration output device.

14. The method of claim 8, further comprising:
identifying from the first image stream that the person is not gazing toward the first image capturing device; and
presenting the prompt further in response to determining that the person is not gazing toward the first image capturing device.

15. A computer program product comprising:
a computer readable storage device; and
program code on the computer readable storage device that when executed by a processor associated with an electronic device, the program code enables the electronic device to provide functionality of:
receiving a first image stream from a first image capturing device of at least one image capturing device, the first image capturing device having a field of view that incorporates a person;
communicating the first image stream, via at least one network interface and network, to at least one second electronic device during a video communication session;
determining that speech is being produced by the person by identifying one or more of: (i) a mouth of the person moving within a current image stream; (ii) the speech being outputted by a speaker and not originating from a first audio stream received from at least one second device; and (iii) a source direction of the speech corresponds to a location of the person; and
in response to a trigger that indicates that the first image stream is being presented as a primary image stream by the at least one second electronic device, the trigger comprising the speech being produced by the person, presenting a prompt at the at least one output device indicating that the person should gaze toward the first image capturing device.

16. The computer program product of claim 15, wherein the program code enables the electronic device to provide the functionality of:
monitoring, via at least one microphone, for the audio input that includes speech;
in response to determining that the audio input from the at least one microphone includes speech above a preset threshold, determining whether the speech is being produced by the person; and
identifying the speech as the trigger in response to determining that the speech is being produced by the person.

17. The computer program product of claim 15, wherein the program code enables the electronic device to provide the functionality of identifying the trigger comprises identifying at least one of: (i) a user selected toggle of a video sharing control that communicates the first image stream to be communicated as a primary image stream to the at least one second electronic device during the video communication session; and (ii) an indication received from the video communication session that the first image stream is being presented at one of the at least one second electronic device.

* * * * *